United States Patent Office 3,071,501
Patented Jan. 1, 1963

3,071,501
METHOD OF TREATING GLASS SHEETS OR PLATES
Charles H. Cowley and Jack W. Hubbell, Toledo, and Marcel E. Durieux, Rossford, Ohio, assignors to Libbey-Owens-Ford Glass Company, Toledo, Ohio, a corporation of Ohio
No Drawing. Filed Mar. 31, 1959, Ser. No. 803,067
4 Claims. (Cl. 156—107)

The present invention relates broadly to a method of treating glass sheets or plates and is of particular utility in protecting the surfaces of glass sheets or plates that are to be used in the manufacture of all-glass multiple sheet glazing units.

In the manufacture of all-glass multiple sheet glazing units, it is conventional procedure to place washed glass sheets in stacks on bucks or carts preparatory to their being fabricated into such units. It has been found, however, that the stacking of the sheets in this manner is accompanied by a number of difficulties which either make the fabrication of the units more difficult and time consuming, or damage the glass sheets in such a way as to make the final completed glazing unit of lower quality or perhaps even unacceptable commercially.

One undesirable condition encountered in the stacking of glass sheets with their face surfaces in direct contact with another is that of "freezing" which is a situation wherein the sheet surfaces adhere to one another. This adherence of the face surfaces of the glass sheets is frequently so strong as to make the sheets practically impossible to separate without breaking one or both of the sheets. This condition is particularly harmful in that it makes it necessary for the operator who is separating the sheets to spend additional time and energy in doing so.

Another condition which is closely related to the freezing mentioned above is that occasionally when the operator is attempting to separate tightly adhered sheets from one another, one of the sheets slides across the other producing scratches on the surface of one of the sheets. A sheet scratched in this, or any other way, must be rejected for use in a multiple sheet glazing unit, since here scratch removal is generally not commercially feasible or practicable.

A still further undesirable condition encountered in the stacking of glass sheets is that known as "crushing." This is a condition which results from the breaking of slightly raised portions on the surface of one sheet when they are forced into contact with the opposed surface of another glass sheet. These crush marks are frequently so severe that, as in the case of scratches, it is necessary to reject the so-marked glass sheets. In actual practice, losses in commercial production runs because of crush have been found to run as high as 10%.

In an effort to overcome the disadvantages and undesirable conditions ordinarily incurred in stacking glass sheets as mentioned above, several methods have been proposed which, for one reason or another, have not been found to be completely satisfactory. For example, one prior art technique has been to interpose wood flour between the glass sheets to be stacked. However, it was found that the sheets which had been separated by wood flour had to be subjected to a washing or cleaning operation prior to their being heated preparatory to the fusing of the edge portions together. Otherwise, the heating of the sheets burns the small particles of wood flour adhering to the glass surfaces which shows up on the inner surfaces of the glass sheets in a finished glazing unit as haze or film which is impossible to remove. This haze or film is caused by the ash which remains after the wood flour is burned off.

Another common method of separating glass sheets during stacking is that of interposing sheets of paper between the contacting sheet surfaces. This process is not only cumbersome and time consuming, but it has also been found that the paper is very apt to stain the glass surfaces, which, for the same reasons given above in the discussion of wood flour, is highly unsatisfactory.

According to the present invention, the above disadvantages heretofore present in the stacking of glass sheets are effectively overcome by the application of a special non-abrasive, combustible powdered material to the sheet surfaces. This material consists of an ashless cellulose powder which is applied to the sheet surfaces by a hand sprinkling or dusting operation prior to the sheets being stacked in face-to-face relationship. However, it is preferable, particularly where a relatively large number of glass sheets are to be treated, to apply the powder by means of a mechanical agency such as a vibrator. This not only eliminates the expenditure of unnecessary labor, but also provides uniformity in the amount of powder applied to each sheet, thus reducing material costs.

Ashless cellulose powder having the desired properties can be produced by treating cellulose pulp first with a hydrochloric acid solution and then with a hydrofluoric acid solution in order to remove ash producing impurities. After the acid treatment and a washing and drying operation, the pulp is ground to a fineness enabling it to pass through a 200 mesh screen, i.e., a grain size of about .0029 inch.

The particles of this cellulose powdered material provide a physical separation of the glass sheets from one another and, therefore, eliminate the sticking or freezing of the adjacent surfaces to one another. The separation of the sheet surfaces from one another by the cellulose powder also prevents "crush" from taking place, not only because of the spacing but also due to the fact that the powder is sufficiently resilient to absorb some of the stacking force. Still further, the powder has the faculty of lubricating the surfaces of the sheets so that if one is removed from the other or slides across the surface of the other it will not scratch the opposing surface.

As pointed out above, the cellulose powder is particularly effective in stacking glass sheets that are to be used in the production of all-glass multiple sheet glazing units, since the cellulose powder burns off above about 1000° F. Thus, a customary step in the manufacture of all-glass multiple sheet glazing units is the preheating of the glass sheets to approximately 950° F. prior to the fusing of the edge portions thereof together. Also during this preheating it is customary for the glass sheets that are to be subsequently fused together to be maintained in face-to-face relationship. According to this invention, the powdered cellulose material applied to the glass sheets is such that it will effectively withstand the preheating of the sheets and will maintain them properly separated from one another during this operation. This is of special importance since if the cellulose powder were to burn off during the preheating step, the bare unprotected surfaces of the glass sheets would be allowed to contact one another and would be subjected to the undesirable conditions set forth above. However, the ashless cellulose powder, because of its high kindling point, is able to withstand the preheating temperature and keep the glass sheets in spaced relationship prior to the fusing operation which is carried out at a relatively higher temperature. In other words, during the fusing operation the ambient temperature of the glass sheets exceeds 1000° F., and the cellulose powdered material is burned off the sheet surfaces. When the material is burned off it leaves no ash and no visible haze on the surfaces of the glass sheets.

We claim:
1. In a method of stacking cleaned glass sheets without contaminating the cleaned surfaces thereof during the subsequent fusing of the edge portions of the sheets together in a heated furnace to form all-glass multiple sheet glazing units, the step of depositing ashless cellulose powder on the facing surfaces of said sheets prior to stacking.

2. In a method of treating a pair of glass sheets which are to be subsequently fused together around the edges thereof to form an all-glass multiple sheet glazing unit, the steps of coating one surface of each glass sheet with an ashless cellulose powder, placing the sheets with the coated surfaces thereof in face-to-face contact with one another, preheating said sheets while in face-to-face contacting relationship to a temperature beneath that at which the cellulose powder will burn off, and then heating the glass sheets and fusing the edge portions of said sheets together at a temperature at which the cellulose powder is burned off the sheet surfaces.

3. In a method of treating glass sheets for fabricating purposes, the steps of coating at least a major surface of each of said sheets with an ashless, combustible powder, preheating the coated sheets to a temperature below that at which the powder will burn off and then heating said sheets to completely remove said powder therefrom.

4. A method as defined in claim 3, in which said ashless powder is a cellulose powder, the coated sheets are heated to a temperature around 950° F. during the preheating step and are heated to a temperature above 1000° F. during the second heating step.

References Cited in the file of this patent
UNITED STATES PATENTS

| | | |
|---|---|---|
| 1,871,324 | Kauffman | Aug. 9, 1932 |
| 2,486,153 | Gwyn | Oct. 25, 1949 |
| 2,643,487 | Parker | June 30, 1953 |
| 2,673,844 | Gilcrease | Mar. 30, 1954 |
| 2,977,722 | Mazzoni | Apr. 4, 1961 |

OTHER REFERENCES

Cross et al.: "Cellulose," pages 3–4, Longmans, Green & Co. (1895).